3,128,757
APPARATUS TO PREVENT FREEZING OF ICE FISHING HOLES
William T. Borman, 2201 Jersey Ave., Minneapolis, Minn.
Filed Mar. 30, 1961, Ser. No. 99,432
3 Claims. (Cl. 126—271.1)

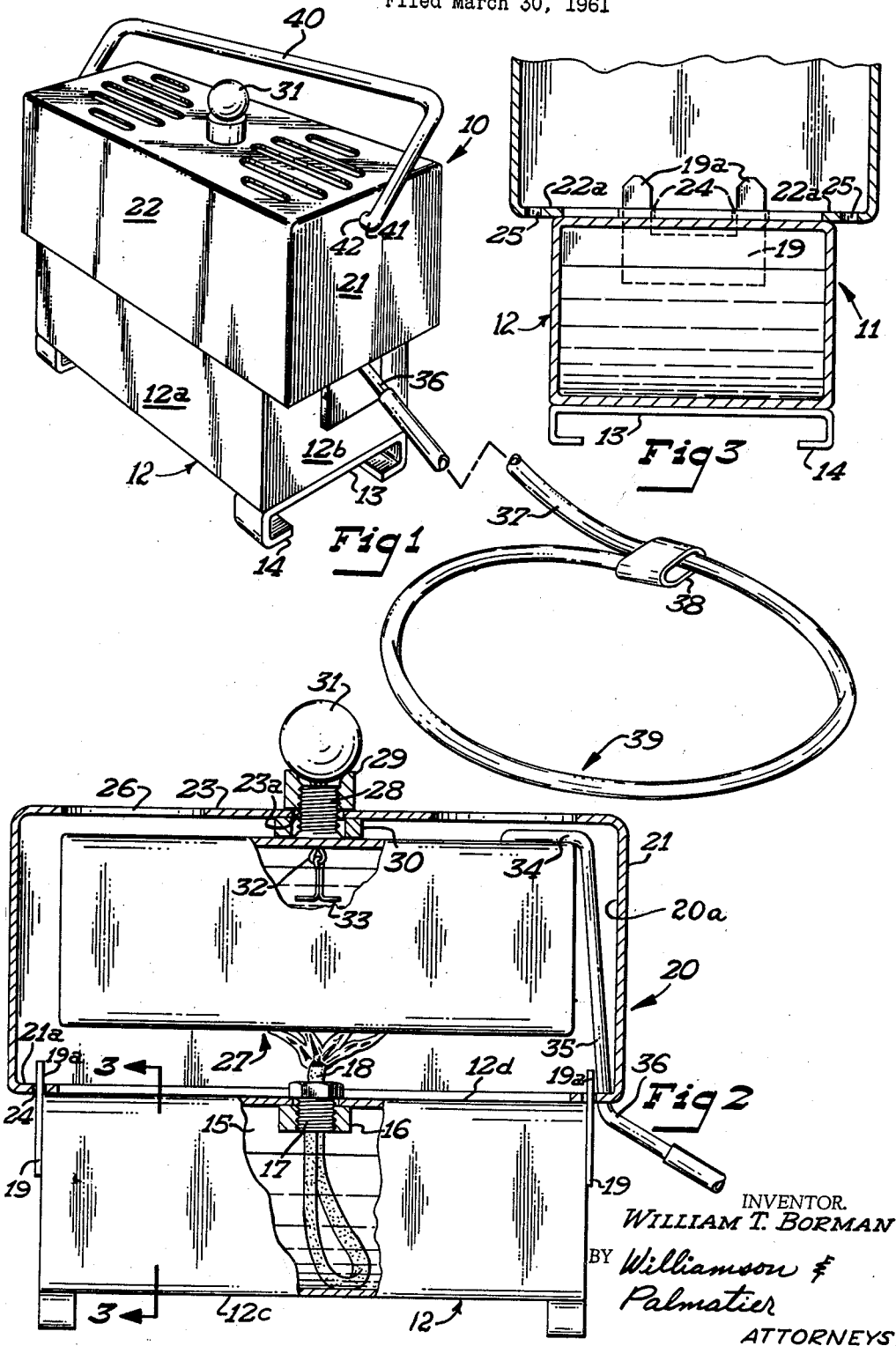

This invention relates to portable heating apparatus for use in preventing ice fishing holes in ice surfaces from freezing and more particularly to portable heating apparatus utilizing a source of steam heat for preventing ice fishing holes from freezing.

The general object of this invention is to provide a novel heating apparatus, of simple and inexpensive construction, for use in preventing fishing holes formed in the ice surface from freezing.

Another object of this invention is to provide a novel and improved heating apparatus for use in preventing fishing holes formed in ice surfaces from freezing and including a steam generator and conduit, the latter defining a buoyant heating loop adapted to float upon the surface of the water within the confines of an ice fishing hole to thereby maintain the fishing hole free of ice.

A further object of this invention is to provide a novel and improved portable steam generating apparatus of compact and highly efficient construction for use in preventing ice fishing holes from freezing and including an adjustable buoyant heater through which steam is passed and, when positioned upon the surface of the water defined by an opening in an ice fishing surface, serves to maintain the fishing hole free of ice but permitting ready access to the hole.

These and other objects and advantages of my invention will more full appear from the following description made in connection with the accompanying drawing wherein like character references refer to the same or similar parts throughout the several views, and in which:

FIG. 1 is a perspective view of my invention with certain parts thereof broken and foreshortened for clarity;

FIG. 2 is a side view of my invention partly in section and partly in elevation with certain parts thereof broken away to better show concealed portions; and FIG. 3 is a vertical section taken approximately along line 3—3 of FIG. 2 and looking in the direction of the arrows.

Referring now to the drawings, it will be seen that one embodiment of my novel heating apparatus, designated in its entirety by the reference numeral 10, includes the heating mechanism 11. This heating mechanism includes a substantially closed fuel reservoir structure 12 of generally rectangular construction and including opposed side walls 12a, end walls 12b, a bottom wall 12c, and top wall 12d. The fuel reservoir structure 12 is provided with a pair of U-shaped support legs 13 having inturned support elements 14 for support of the reservoir structure upon a surface. It will be noted that these U-shaped support legs are affixed to the bottom wall 12c of the fuel reservoir structure as by welding and are preferably disposed adjacent the respective end walls 12b thereof.

The interior 15 of the fuel reservoir structure is adapted to contain a supply of fuel therein and it will be noted that the top wall 12d of the reservoir structure is provided with an internally threaded coupling member 16 affixed thereto and depending into the interior thereof. The bore of the threaded coupling member 16 is disposed in registering relation with an opening formed in the top wall 12d of the reservoir structure for receiving a threaded hollow fitting 17 therethrough. It will be noted that the threaded hollow fitting is provided with a hexagonal shaped nut affixed to the upper portion thereof the latter serving as a convenient stop. A wick structure 18 constructed of a suitable textile material extends through the threaded fitting 17 to the interior 15 of the reservoir structure and projects upwardly therefrom. When fuel is disposed within the interior chamber 15 of the reservoir structure 12 and when the wick is ignited, heating mechanism 11 will provide a suitable source of heat for heating a water supply and thereafter generating steam in a manner to be described hereinbelow.

It will be seen that the end walls 12b each have a plate 19 affixed thereto, the latter having a pair of tabs 19a projecting upwardly therefrom. A hollow heating chamber structure 20 also constructed of a suitable metallic material such as galvanized steel or the like is mounted upon the heating mechanism 11 and this heating chamber structure which is of substantially rectangular configuration includes end walls 21, side walls 22 and a top wall 23.

It will be noted that the heating chamber structure does not have a bottom wall but that the end walls 21 are each provided with inturned end flanges 21a while the side walls 22 are each provided with inturned side wall flanges 22a. The end flanges 21a have suitable openings 24 formed therein for the reception of the attachment tabs 19a therethrough. With this arrangement, the tabs 19a and the openings 24a define a quick coupling type bayonet connection which permits the heating chamber structure to be detachably connected to the heating mechanism in superimposed relation therewith. It will be noted that the heating chamber structure 20 is substantially larger than the fuel reservoir structure 12 so that the heating chamber structure actually overhangs the reservoir structure. When the heating chamber structure 20 is positioned in mounted relation upon the heating mechanism 11 the structures cooperate with each other to define a heating chamber 20a within the interior of the heating chamber structure. Referring now to FIG. 3, it will be seen that the side wall flanges 22a are provided with air ports 25 to permit air to pass therethrough into the heating chamber 20a to thereby facilitate and insure combustion therein when the wick 18 is ignited. It will also be noted that the top wall 23 of the heating chamber structure 20 is provided with suitable heating vents 26, as best seen in FIG. 1.

A substantially closed receptacle 27 which defines a combination water jacket and steam chamber is positioned within the heating chamber structure 20, as best seen in FIG. 2. This closed receptacle 27 which is of substantially rectangular configuration, is constructed of a suitable metallic material such as galvanized steel and the upper wall thereof is provided with a hollow externally threaded fitting 28. It will be noted that this hollow externally threaded fitting 28 is arranged in registering relation with an opening formed in the wall to thereby communicate with the interior of the receptacle. This fitting 28 projects through an opening 23a formed in the top wall of the heating chamber structure and is threadedly engaged by an annular collar 29, the latter being positioned upon the exterior of the top wall 23. A conventional spacer element 30 of annular configuration is interposed between the upper wall of said receptacle 27 and the inner surface of the top wall 23 of the heating chamber structure 20 and when the receptacle 27 is so mounted within the heating chamber structure 20, it will be noted that the receptacle is spaced generally from the interior wall surfaces of the heating chamber structure.

A ball type closure 31 is positioned upon the upper end of the fitting 28 and is provided with a flexible chain 32 affixed thereto, the latter having a retaining element 33 disposed within the interior of the receptacle 27 and cooperating therewith to prevent accidental disconnection of the closure from the fitting. The receptacle 27 is adapted to have a supply of water disposed therein which when heated will be generated into steam, the purpose of which will become more apparent hereinbelow.

The receptacle 27 is provided with an elongate steam outlet conduit 34 preferably constructed of a suitable metallic material such as copper tubing and which is affixed to the upper wall of the receptacle 27. This outlet conduit 34 is provided with a depending portion 35 which terminates in the forwardly projecting end portion 36. The steam outlet conduit 34 is connected in communicating relation with the interior of the receptacle 27 so that steam generated within the receptacle will pass outwardly therethrough.

My novel heating apparatus 10 also includes an elongate conduit 37 preferably constructed of a buoyant plastic material which is both flexible and resilient. One end of the elongate conduit 37 is adapted to be connected in telescoping fashion with the forwardly projecting end portion of the steam outlet 34. The outer terminal end of the plastic conduit is also open and this terminal portion is received within a small plastic sleeve element 38 slidably positioned around the conduit. With this arrangement, it will be seen that the conduit can be bent upon itself so that the terminal intermediate portions thereof are interconnected by being removably received within the small plastic sleeve to thereby define a heating loop 39 which is of generally circular configuration. This heating loop 39 is adapted to be positioned upon the surface of the water within the confines of a fishing hole and when steam is passed therethrough will maintain the ice fishing hole free of ice. It will be noted that when the terminal portion of the plastic conduit is positioned within the small plastic sleeve 38 the sleeve may thereafter be slidably moved along any intermediate portion of the conduit to thereby vary the size of the heating loop 39. With this arrangement, the size of heating loop may be readily varied to accommodate any size fishing hole.

In order to facilitate carrying of the heating apparatus, a U-shaped bail or handle 40 is pivotally connected to the end wall 21 of the heating chamber structure 20. It will be noted that the U-shaped bail is provided with inturned or inwardly extending ears 41 which pass through openings 42 formed in the heating chamber structure and walls so that the handle may be readily pivoted to an out-of-the-way position or may be grasped by the user for carrying the apparatus.

During operation of my novel heating apparatus, the various parts thereof may be readily assembled and are arranged and constructed for ready disassembly thereof. In this connection, it will be noted that the heating chamber structure is readily removed from the heating mechanism while the steam conducting conduit 37 is readily detachable from the receptacle 27. In use the fuel reservoir 12 may be filled with a suitable fuel and the wick 18 ignited. The combination water jacket and steam chamber 27 is filled with a sufficient amount of water and the heating chamber structure 20 will be positioned upon the heating mechanism 11. The tabs 19a will readily engage in the openings 24 formed in the inturned end flanges 21a so that the receptacle 27 is positioned in close proximity to the wick 18. It will be seen that the entire chamber 20a of the heating chamber structure 20 will be heated and water in the receptacle 27 will be converted to steam. The steam will escape outwardly through the steam outlet 34 and when the elongate conduit 37 is connected to the latter the steam will pass therethrough. The apparatus will be positioned closely adjacent the ice fishing hole so that the heating loop 39 may be positioned upon a surface of the water within the confines of the fishing hole. Since the elongate conduit 37 is formed of buoyant plastic material, the heating loop will float upon the surface of the water and steam passed through the conduit will heat the latter and will maintain the water at the surface thereof in ice free condition.

The outer terminal end portion of the conduit 37 is open so that steam readily escapes therethrough. As pointed out above, the relative adjustability of the conduit and plastic sleeve permit the heating 39 to be varied with regard to its circumferential size. Thus, it will be seen that any ice fishing hole may be accommodated.

It has also been found that through the use of a plastic material, a fishing line coming in contact with the heating loop even during a heating operation will not cause the plastic heating line to melt into severed relation. This has been one of the objections commonly associated with prior art devices which utilize heated metal structures. It will also be noted that the heating loop may be readily adjusted to be positioned into contacting relation with the ice defining the ice fishing hole so that ready access to the fishing hole from above is not interfered with. The ball type inclosure 31 not only serves as a closure for the receptacle 27 to prevent the escape of water therein but also serves as a safety valve which will be readily opened if a predetermined steam pressure within the receptacle 27 is exceeded. The suspension of the receptacle 27 within the heating chamber structure 20 not only facilitates heating of the receptacle 27 but also allows the heated air to be discharged upwardly through the heating vents 26 so that the heating apparatus also serves as a small stove. This spacing also permits the end walls of the heating chamber structure 20 to be maintained in a relatively cool condition, thus facilitating handling of the heating apparatus by means of the handle 40. It will also be noted that the compact construction of my heating apparatus renders it highly desirable since it can be easily and readily handled and stored.

It will, therefore, be seen from the foregoing description that I have provided a novel heating apparatus for use in preventing ice holes from freezing and which utilizes a heating loop constructed of a buoyant material for maintaining the fishing hole free of ice. It will also be noted from the preceding paragraphs that the fishing loop defined by my uniquely constructed plastic steam conducting conduit is readily adjustable, thus accommodating almost any size ice fishing hole and also permits the ice fishing hole to be readily accessible from above.

It will also be seen that the vented heated chamber structure serves very nicely as a hand warmer. It will, of course, be appreciated that when small bait are applied to relatively small hooks, the operation is extremely difficult if the ice fisherman's hands are numb. Heat in the heating chamber will pass upwardly through the vents in the upper surface thereof and will readily warm the hands of the user.

It will, therefore, be seen that I have provided a novel heating apparatus of simple and inexpensive construction, which functions in a more efficient manner than any heretofore known comparable devices.

It will, of course, be understood that various changes may be made in the form, details, arrangements and proportions of the various parts without departing from the scope of my invention.

What is claimed is:

1. A portable apparatus to prevent a fishing hole in an ice surface from freezing, a heating chamber structure, a substantially closed receptacle for containing a supply of water therein and being mounted within said heating chamber structure, mechanism for heating the water supply within the receptacle to thereby generate steam within the latter, an elongate tubular conduit constructed of a buoyant flexible non-metallic material and having one end thereof connected with said receptacle in communicating relation with the interior thereof so that steam generated within the receptacle will pass through the conduit, and means adjustably interconnecting the outer terminal portion of the conduit and intermediate portion thereof to thereby define an adjustable generally circular heating loop which when positioned upon the surface of the water within said fishing hole will float and thereby prevent freezing of the water.

2. The structure as defined in claim 1 wherein said heating chamber structure is detachably mounted on said heating mechanism.

3. The structure as defined in claim 1 wherein said engagement means comprises a sleeve slidably receiving the outer terminal and intermediate portions of the conduit therein to thereby permit ready adjustment of the size of the heating loop.

References Cited in the file of this patent

UNITED STATES PATENTS

| | | |
|---|---|---|
| 80,676 | Soule | Aug. 4, 1868 |
| 331,065 | Kinney | Nov. 24, 1885 |
| 1,011,022 | Broderick | Dec. 5, 1911 |
| 1,239,546 | Warner | Sept. 11, 1917 |
| 2,774,856 | Paulsen et al. | Dec. 18, 1956 |
| 2,990,829 | McDonough et al. | July 4, 1961 |